US012319256B2

(12) United States Patent
Baral et al.

(10) Patent No.: US 12,319,256 B2
(45) Date of Patent: Jun. 3, 2025

(54) FAULT DETECTION ARRANGEMENT FOR VEHICLE BRAKE SYSTEM

(71) Applicant: CTS Corporation, Lisle, IL (US)

(72) Inventors: Ganesh Baral, Mishawaka, IN (US); Kevin Wolschlager, Elkhart, IN (US); David Kolberg, Granger, IN (US); Arthur Hazlewood, Warsaw, IN (US)

(73) Assignee: CTS Corporation, Lisle, IL (US)

( * ) Notice: Subject to any disclaimer, the term of this patent is extended or adjusted under 35 U.S.C. 154(b) by 344 days.

(21) Appl. No.: 17/817,771

(22) Filed: Aug. 5, 2022

(65) Prior Publication Data

US 2024/0042984 A1 Feb. 8, 2024

(51) Int. Cl.
*B60T 17/18* (2006.01)
*B60T 13/74* (2006.01)
*B60T 17/22* (2006.01)

(52) U.S. Cl.
CPC ............ *B60T 17/22* (2013.01); *B60T 13/741* (2013.01); *B60T 17/18* (2013.01);
(Continued)

(58) Field of Classification Search
CPC ...... B60T 13/74; B60T 13/741; B60T 13/745; B60T 13/746; B60T 13/748; B60T 17/18; B60T 17/22; B60T 17/221; B60T 17/222; B60T 17/223; B60T 2220/04; B60T 2270/40; B60T 2270/402; B60T 2270/404; B60T 2270/406; B60T 2270/82; B60T 2270/88
(Continued)

(56) References Cited

U.S. PATENT DOCUMENTS 7,826,952 B2 * 11/2010 Disser ................... B60T 8/1755
701/72
10,731,720 B2 * 8/2020 Hall ....................... F16D 66/025
(Continued)

FOREIGN PATENT DOCUMENTS

| CN | 103802807 A | 5/2014 |
| EP | 3630560 A1 | 4/2020 |
| JP | 6747282 B2 | 8/2020 |

OTHER PUBLICATIONS

International Search Report and Written Opinion for Application No. PCT/US2023/071678, dated Nov. 7, 2023 (14 pages).

*Primary Examiner* — Erick R Solis
(74) *Attorney, Agent, or Firm* — Michael Best & Friedrich LLP (57) ABSTRACT

A method and system is provided for determining faults in a vehicle brake system. An electronic processor obtains a brake pedal signal from a brake pedal that indicates a driver intent to brake and obtains a vehicle braking response condition signal from a brake system feedback sensor. The electronic processor determines a fault state when (1) the brake pedal signal is indicative of no brake pedal movement and the vehicle braking response signal is indicative of a vehicle braking response occurring, or when (2) the brake pedal signal is indicative of brake pedal movement and the vehicle braking response condition signal is indicative of no occurrence of a vehicle braking response. The electronic processor controls an output of an audio or visual indication of a fault state and/or controls braking operation of the vehicle in response to the fault state.

18 Claims, 5 Drawing Sheets

(52) U.S. Cl.
  CPC ..... *B60T 2220/04* (2013.01); *B60T 2270/404* (2013.01); *B60T 2270/413* (2013.01); *B60T 2270/88* (2013.01)

(58) Field of Classification Search
  USPC .............................................. 701/70, 76, 92
  See application file for complete search history.

(56) References Cited

U.S. PATENT DOCUMENTS

| | | | | |
|---|---|---|---|---|
| 11,505,173 | B2* | 11/2022 | Georgin | B60T 8/1703 |
| 2005/0131613 | A1* | 6/2005 | Bohm | B60T 7/042 |
| | | | | 701/71 |
| 2005/0173980 | A1* | 8/2005 | Bohm | B60T 7/042 |
| | | | | 303/155 |
| 2006/0020378 | A1* | 1/2006 | Salman | B60T 8/885 |
| | | | | 701/32.9 |
| 2007/0194621 | A1* | 8/2007 | Ishizuka | B60T 8/4063 |
| | | | | 303/10 |
| 2012/0053803 | A1* | 3/2012 | Ueno | B60T 13/745 |
| | | | | 701/1 |
| 2013/0332030 | A1* | 12/2013 | Koukes | B60W 10/20 |
| | | | | 701/41 |
| 2014/0250995 | A1* | 9/2014 | Vaeretti | G01L 5/28 |
| | | | | 73/132 |
| 2017/0217419 | A1 | 8/2017 | Yen et al. | |
| 2018/0056960 | A1 | 3/2018 | Krueger et al. | |
| 2018/0141530 | A1* | 5/2018 | Kilmurray | B60T 13/686 |
| 2018/0215368 | A1* | 8/2018 | Isono | B60T 13/741 |
| 2019/0100137 | A1 | 4/2019 | Wolf-Monheim | |
| 2019/0375391 | A1* | 12/2019 | Ernst | B60T 7/042 |
| 2021/0284120 | A1* | 9/2021 | Georgin | B60T 8/1703 |
| 2023/0192049 | A1* | 6/2023 | Marx | B60T 7/042 |
| | | | | 701/70 |
| 2023/0278541 | A1* | 9/2023 | Shibata | B60W 30/18127 |
| | | | | 701/22 |
| 2024/0034225 | A1* | 2/2024 | Gagliano | B60Q 7/00 |
| 2024/0042978 | A1* | 2/2024 | Galizzi | B60T 8/3255 |
| 2024/0227808 | A1* | 7/2024 | Lo | B60W 50/035 |
| 2024/0286589 | A1* | 8/2024 | Inuzuka | B60T 7/042 |

\* cited by examiner

FAULT DETECTION ARRANGEMENT FOR VEHICLE BRAKE SYSTEM

FIELD OF THE INVENTION

A vehicle brake system includes an arrangement that determines when the brake system is operating improperly.

BACKGROUND

Brake-by-wire vehicle brake pedals do not utilize a conventional connection to the other components of a braking system, for example, a mechanical connection to a vacuum or hydraulic brake system. In some brake-by-wire systems, a sensor monitors how far a driver has pushed the brake pedal. This distance is used to determine the amount of braking force requested. A control unit or computer then determines how much hydraulic pressure is required, and an electric pump is used to generate that pressure and, for example, cause calipers to push on a brake disc to stop the vehicle.

SUMMARY

When there is a mechanical connection between a brake pedal and other components of the braking system there is a certain feel that the drive experiences through his or her foot and leg. When there is no mechanical connection between the brake pedal and the rest of the braking system, the driver experiences a different feel. There is a desire to replicate or emulate the feel of a conventional connection between a brake pedal and a braking system in brake-by-wire (sometimes referred to as or fly-by-wire) vehicle brake pedals. Emulating that feel can be achieved in a variety of ways. There is also a desire to ensure that the amount of braking force requested via a brake-by-wire brake pedal matches or is otherwise correlated to the actual braking performed by the braking system.

Embodiments, aspects, and features described herein are, among other things, directed to a brake-by-wire vehicle brake pedal system that determines when the brake system is operating improperly.

One aspect includes a method for determining a fault in a vehicle brake system. The method includes receiving a brake pedal signal from a brake pedal sensor that indicates a driver intent to brake; and receiving a vehicle braking response condition signal from a brake system feedback sensor for at least one vehicle wheel of a vehicle. The method also includes determining, with an electronic processor, based on the brake pedal signal and the vehicle braking response condition signal, that the vehicle brake system is in a fault state when (1) the brake pedal signal is indicative of no brake pedal movement and the vehicle braking response condition signal is indicative of a vehicle braking response occurring, or when (2) the brake pedal signal is indicative of brake pedal movement and the vehicle braking response condition signal is indicative of no occurrence of a vehicle braking response. The method also includes providing at least one selected from a group consisting of a visual or audio indicator indicating the fault state, and controlling operation of the vehicle in response to the fault state.

Another aspect includes a vehicle brake system for determining a fault in the vehicle brake system. The vehicle brake system includes a vehicle brake pedal sensor for providing a brake pedal signal from a brake pedal that indicates a driver intent to brake; a brake system feedback sensor for providing a vehicle braking response condition signal; and an electronic processor. The electronic processor is configured to receive the brake pedal signal and receive the vehicle braking response condition signal, and determine a fault state when (1) the brake pedal signal is indicative of no brake pedal movement and the vehicle braking response condition signal is indicative of a vehicle braking response occurring, or when (2) the brake pedal signal is indicative of brake pedal movement and the vehicle braking response condition signal is indicative of no occurrence of a vehicle braking response The electronic processor is also configured to provide at least one selected from a group consisting of an audio or visual indication of a fault state, and a control of braking operation of the vehicle in response to the fault state.

Other embodiments, features, and aspects will become apparent by consideration of the detailed description and accompanying drawings.

DETAILED DESCRIPTION

Before any embodiments, aspects, or features are explained in detail, it is to be understood that the arrangements are not limited in their application to the details of construction and the arrangement of components set forth in the following description or illustrated in the following drawings. Other embodiments, aspects, and features are possible and are capable of being practiced or of being carried out in various ways.

Figure 1:
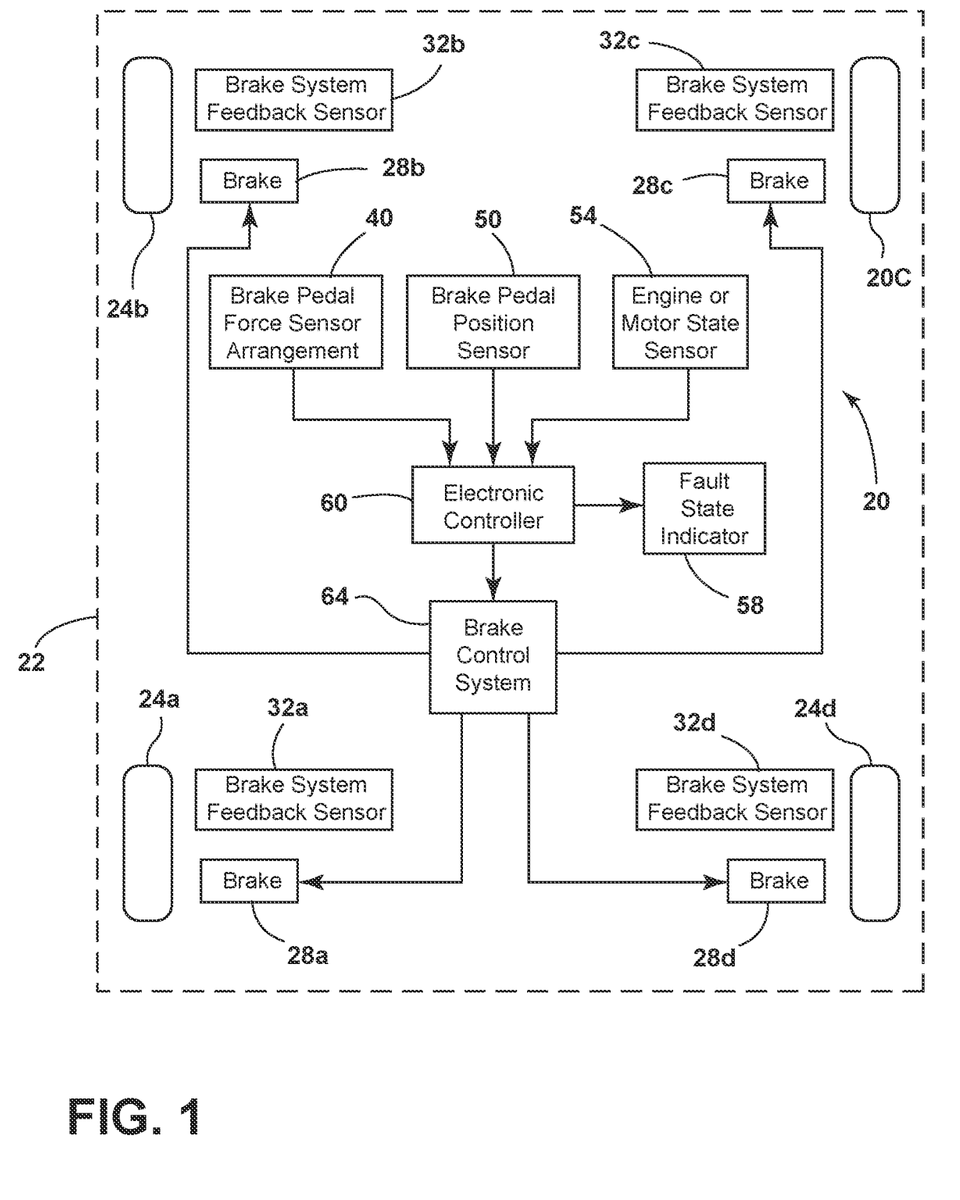
FIG. 1 is a block diagram of a vehicle brake system, according to some examples.

FIG. 1 illustrates a vehicle brake system 20 for a vehicle 22 that includes a plurality of wheels 24a, 24b, 24c, 24d. The vehicle 22 includes brakes 28a, 28b, 28c, 28d associated with each of the wheels.

The arrangement of FIG. 1 includes brake system feedback sensors 32a, 32b, 32c, 32d provided adjacent each of the wheels 24a-24d to determine actuation of the respective brakes 28a, 28b, 28c, 28d. In one example, the brake system feedback sensor 32a-32d includes a hydraulic pressure sensor sensing the hydraulic pressure applied to the respective brake 28a-28d. Other arrangements are contemplated.

FIG. 1 also shows a brake pedal force sensor arrangement 40, a brake pedal position sensor 50, and an engine state or motor state sensor 54. Sensors 32a-32d, 40, 50, 54 provide inputs to an electronic controller 60. The electronic controller 60 provides outputs to a brake control system 64 connected to the vehicle brakes 28a-28d. The electronic controller 60 is also connected to a fault indicator 68 within the vehicle 22.

Figure 2:
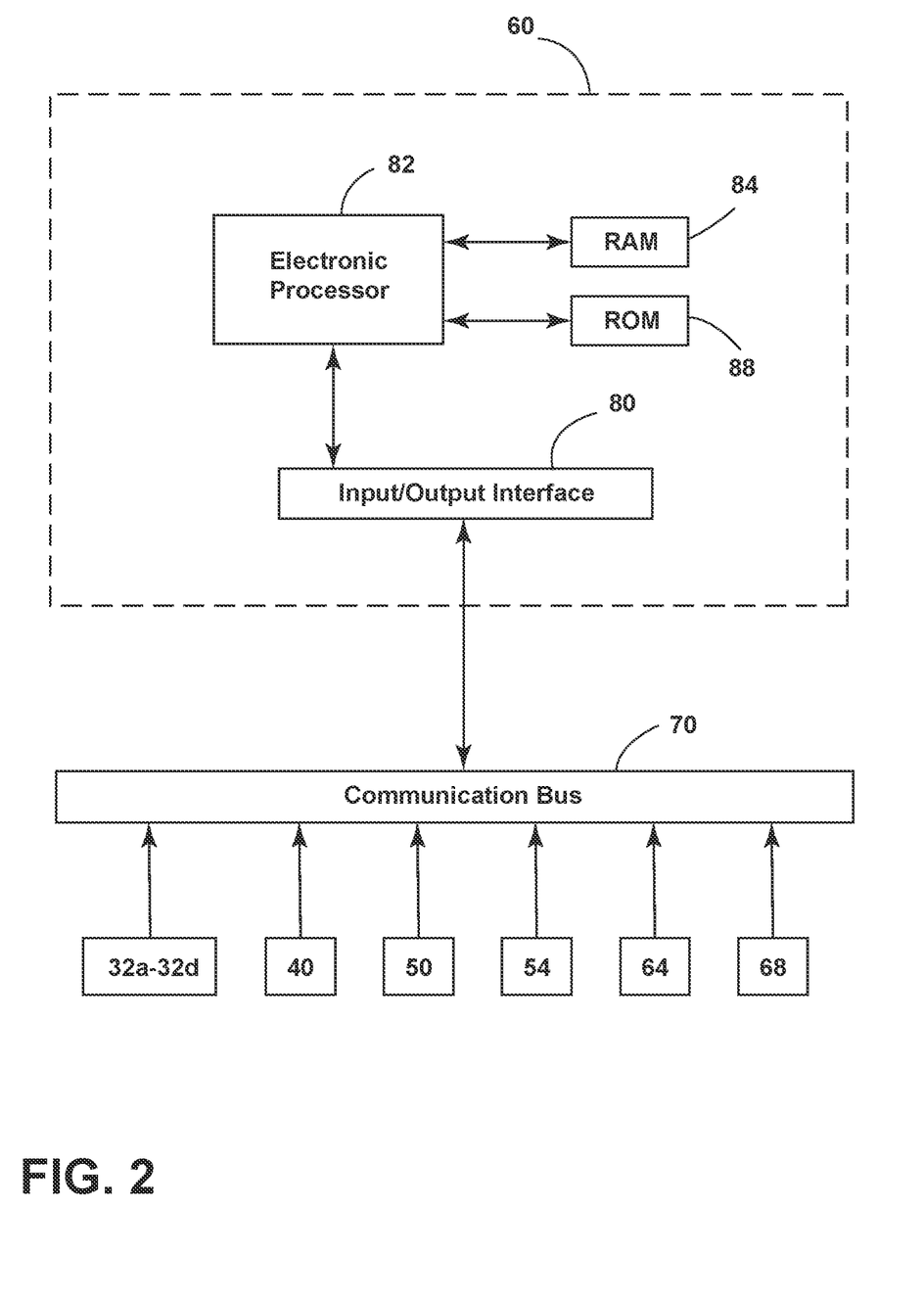
FIG. 2 is a block diagram showing details of the electronic brake controller and inputs thereto, according to one example.

FIG. 2 schematically illustrates the electronic controller 60 in more detail. As shown in FIG. 2, the electronic controller 60 is connected to a plurality of sensors 40, 54, via a communication bus 70. The vehicle communication bus 70 can be a controller area network ("CAN") bus, a CAN-FD (flexible data-rate) bus, a Flex-Ray bus or the like. In one embodiment, the sensors of the vehicle 22 include the brake pedal force sensor arrangement 40, the brake pedal position sensor 50, the engine state sensor or motor state sensor 54, and the brake system feedback sensors 32a-32d.

As shown in FIG. 2, the electronic controller 60 includes an input/output interface 80, an electronic processing unit ("EPU") or an electronic processor 82, and one or more non-transitory memory or computer-readable modules, such as a random access memory ("RAM") 84 and read-only memory ("ROM") 88. The input/output interface 80 transmits and receives data over the communication bus 70, including data from the sensors. It should be understood that the electronic controller 60 can include multiple processors, additional computer-readable medium modules, multiple I/O interfaces, and/or other additional components or modules (e.g., hardware, software, or a combination thereof).

The electronic processor 82 receives the information from the input/output interface 80 and processes the information by executing one or more instructions from software modules (which are also referred to as a "controller" or "controllers"). The instructions, modules, or controllers are stored in non-transitory computer-readable medium, such as ROM 88. The electronic controller 60 stores and retrieves information (e.g., information received from the communication bus 70 or information generated by instructions or modules executed by the electronic processor 82 to and from the RAM 84. The non-transitory computer readable medium includes volatile memory, non-volatile memory, or a combination thereof. The computer-readable medium stores operating system software, applications and/or instructions, data, or combinations thereof. It should be understood that although only a single electronic processor 82, RAM 84, ROM 88, and input/output interface 80 are illustrated in FIG. 2, the electronic controller 60 can include multiple processing units, memory modules, and/or input/output interfaces.

Although the electronic controller 60 is illustrated in FIGS. 1-2 as a stand-alone component, in some embodiments the electronic controller 60 can be combined with other vehicle components. For example, the electronic controller 60 can be connected to other ECUs or controller or additional or different sensors. The electronic controller 60 can also perform multiple functions, not just brake control and fault detection.

Figure 3:
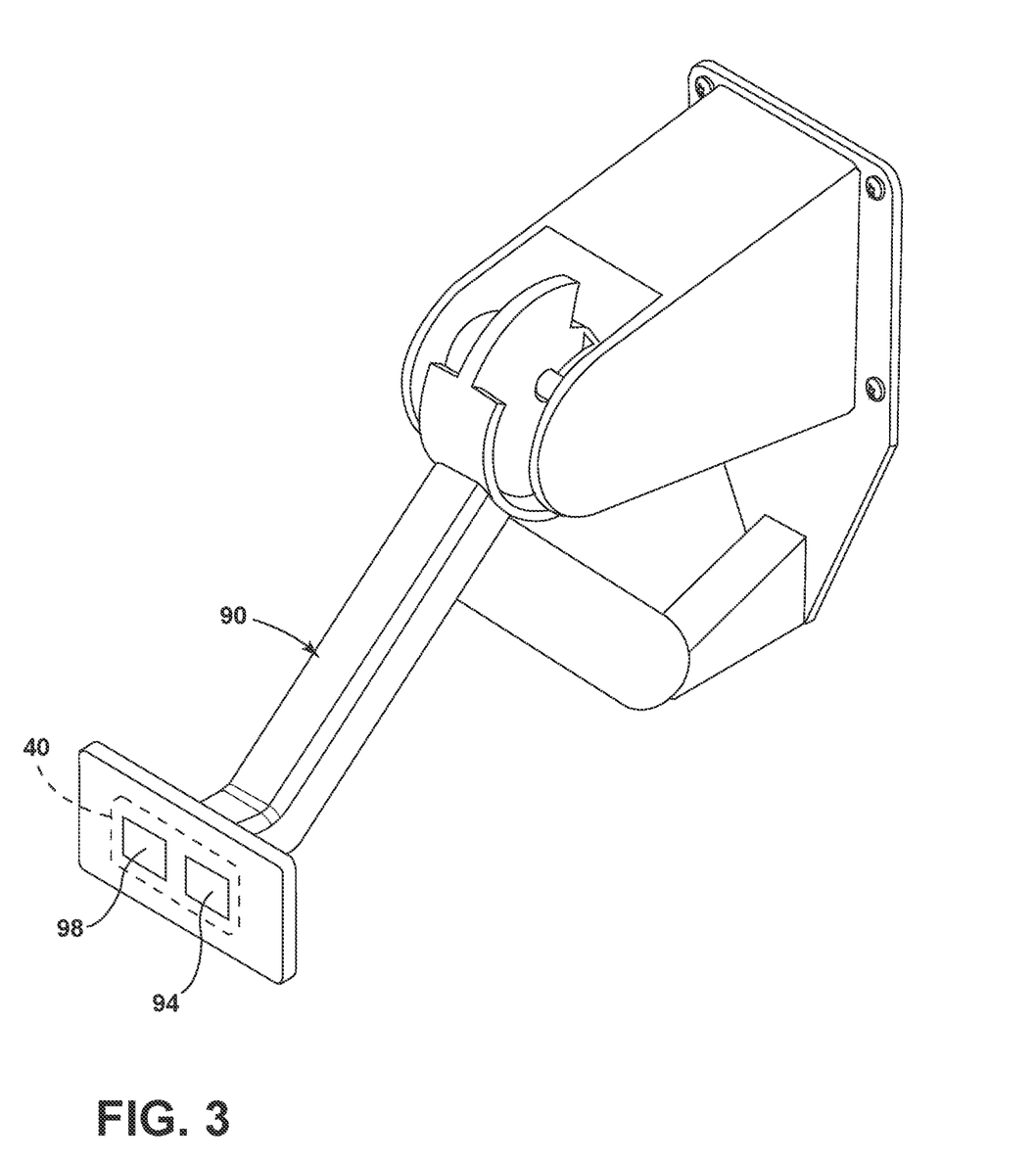
FIG. 3 is a perspective view of a brake pedal with a brake pedal force sensor arrangement.

FIG. 3 shows a vehicle brake pedal 90 that includes a brake pedal force sensor arrangement 102. The brake pedal force sensor arrangement 40 includes a first brake pedal force sensor 94 and a second redundant brake pedal force sensor 98.

Operation for Fault Detection

Figure 4:
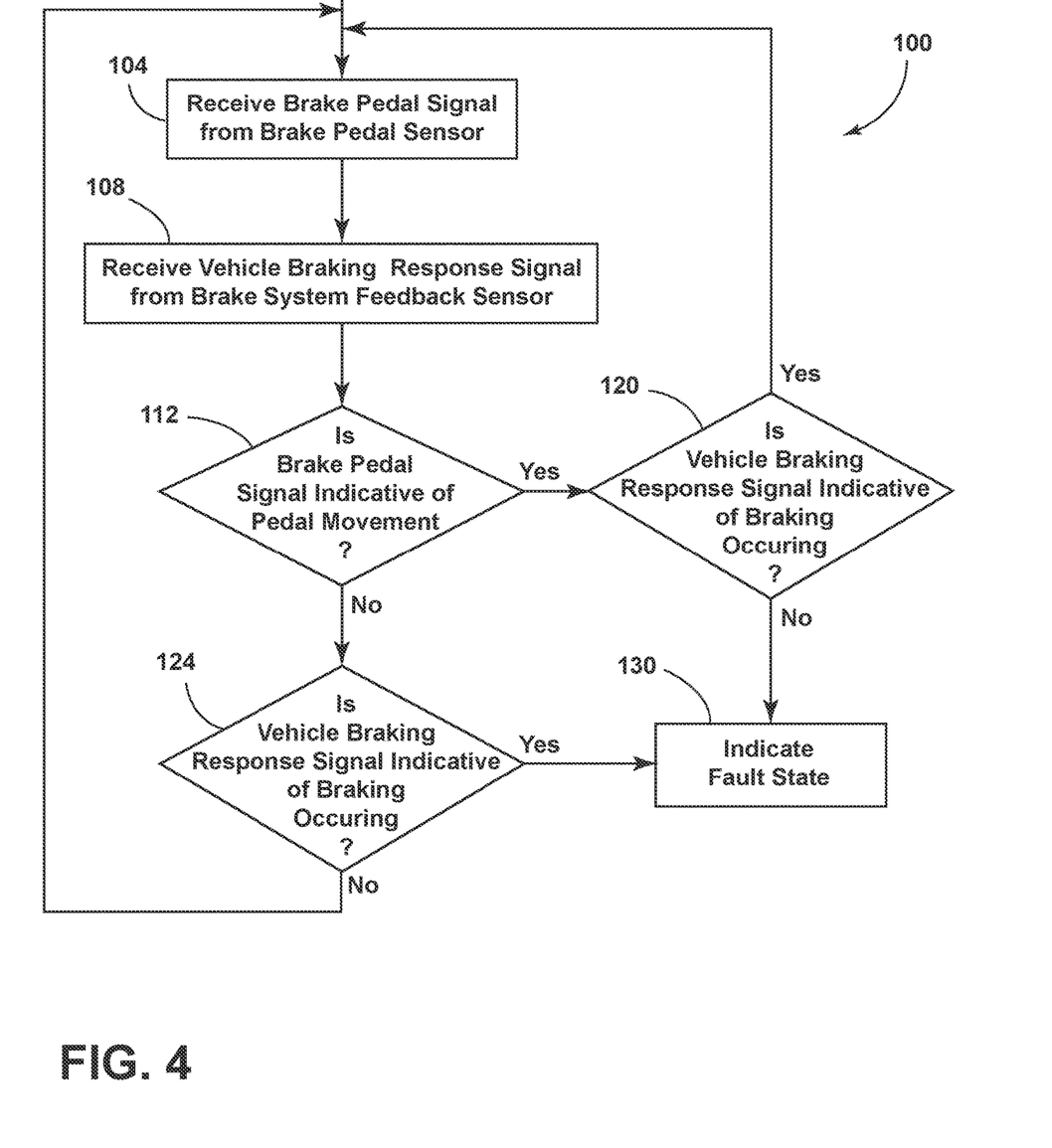
FIG. 4 is a flow chart showing operation of the vehicle brake system to determine a fault.

FIG. 4 shows a flow chart 100 depicting operation of the fault detection arrangement of the vehicle brake system 20. In operation, the electronic processor 82 of the electronic controller 60 is configured to execute algorithms or programs received from memory 84, 88.

As shown in FIG. 4, at step 104 the electronic processor 82 receives a brake pedal signal from the vehicle brake pedal sensor via the communication bus 70 and the input/output interface 80. The electronic processor 82 advances to step 108. In one embodiment, the vehicle brake pedal sensor is the brake pedal position sensor 50 and the brake pedal signal is the brake pedal position signal.

At step 108, the electronic processor 82 receives a vehicle braking response condition signal from one or a combination of the brake system feedback sensors 32a-32d via the communication bus 70 and the input/output interface 80 or another connection. The electronic processor 82 then advances to decision step 112.

At decision step 112, the electronic processor 82 determines whether the brake pedal signal from the brake pedal position is indicative of pedal movement or not. When the brake pedal signal is indicative of pedal movement/braking, the electronic processor 82 advances to decision step 120. When the brake pedal signal is not indicative of driver intent to brake, the electronic processor advances to step 124.

When braking is occurring, the electronic processor advances to decision step 120. At decision step 120, the electronic processor 82 determines whether the vehicle braking response condition signal from a plurality of brake system feedback sensors 32a-32d is indicative of braking occurring. When the vehicle braking response condition signal matches braking as with the brake pedal signal, the electronic processor 82 returns to step 104 and repeats the steps. When the vehicle braking response condition signal is not indicative of an occurrence of braking at decision step 120, the electronic processor advances to step 130 and indicates a fault state for the vehicle braking system. The fault state signal is indicated by the fault indicator 68. The electronic processor 82 provides a signal via the input/output interface 80 and the communication bus 70 to the fault indicator 68 in one arrangement.

Returning to decision step 112, when the brake pedal signal does not indicate brake pedal movement, the electronic processor 82 advances to decision step 124. At decision step 124, the electronic processor 82 determines whether the vehicle braking response condition signal from one or more of the brake system feedback sensors 32a-32d indicates vehicle braking is occurring. If not occurring and thus corresponding to no pedal movement, the electronic processor 82 returns to step 124 and repeats the steps. If occurring without pedal movement at step 124, the electronic processor 82 advances to step 130.

At step 130, the electronic processor outputs a fault state signal. The fault state signal is indicated by the fault indicator 68. The fault indicator signal is a least one selected from a group consisting of a fault indicator signal visually provided on a dashboard display and an audible chime or voice alarm provided over a vehicle sound system. In one embodiment, both an audible and visual alarm are provided.

In addition to or instead of the fault state indication at step 130, in another arrangement, the electronic processor 82 also provide a vehicle control signal for controlling operation of the vehicle to minimize speed and/or eventually stop the vehicle at an appropriate location due to the fault state of the vehicle brake system 20.

Other arrangements are contemplated. In one arrangement, the vehicle braking response condition signal is sensed by a brake system feedback sensor 32a-32d in a hydraulic brake system disposed at the at least one of the vehicle wheels 24a-24d. In another arrangement, the vehicle braking response condition signal is sensed by the brake system feedback sensor 32a-32d that is part of an electromechanical brake system disposed at at least one vehicle wheel 24a-24d.

In one arrangement, the brake system feedback sensors 32a-32d include brake pressure sensors. In another arrangement, the brake system feedback sensors are a plurality of brake system feedback sensors 32a-32d at each of the vehicle brakes 28a-28d and the average of the sensed vehicle braking response condition signals is determined.

In one arrangement, the vehicle 22 is one selected from a group consisting of: an electric vehicle, an internal combustion engine vehicle, and a hybrid vehicle. In another embodiment, the vehicle is an autonomous vehicle.

Figure 5:
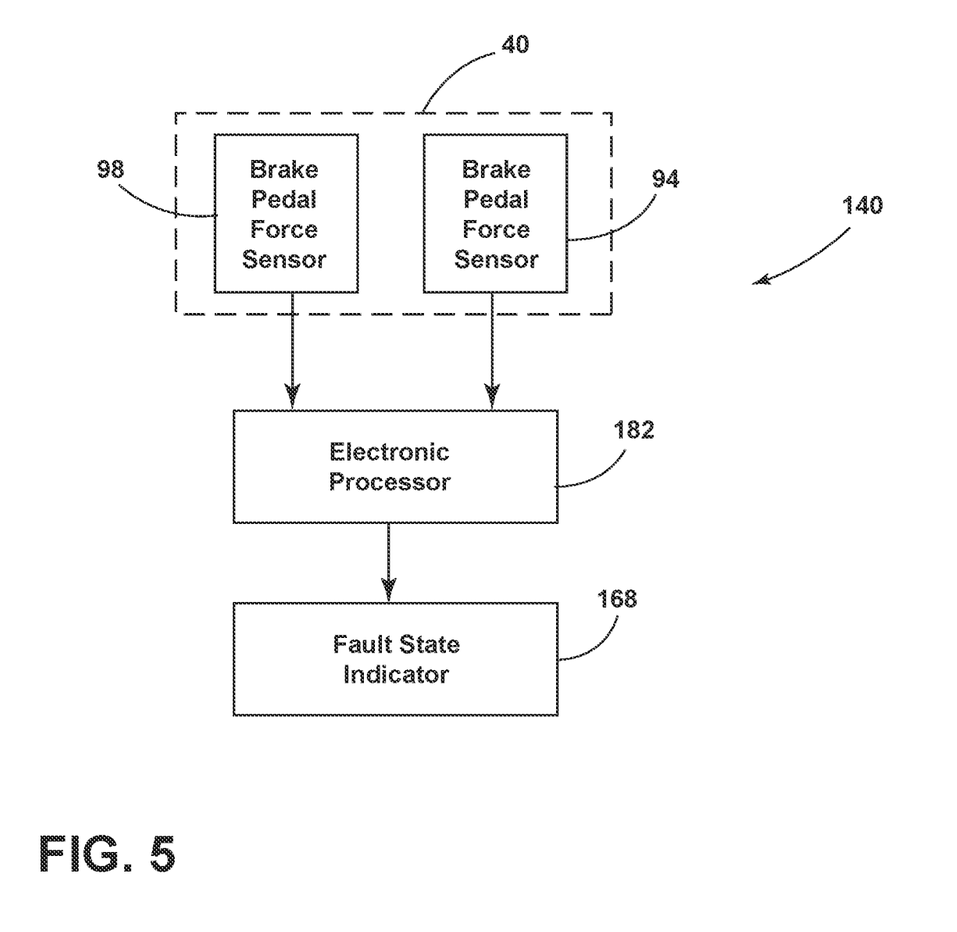
FIG. 5 is a block diagram showing details of the redundant brake pedal force sensors shown in FIG. 3 and an electronic processor.

FIG. 5 shows a block diagram 140 of another arrangement of the brake pedal force sensor arrangement 40 shown in FIG. 3 that includes a pair of brake pedal force sensors 94, 98. The outputs of the first brake pedal force sensor 94 and the second redundant brake pedal force sensor 98 are provided to an electronic processor 182. The outputs can be provided by direct connection or over a communication bus. The electronic processor 182 compares the brake pedal force signals. When the signals are not similar, the electronic processor 182 provides a signal to a fault state indicator 168 to indicate failure of a brake pedal force sensor 94, 98. In response, a visual or audio indicator indicating the fault state is provided. The output can specify the fault state is directed to a brake force sensor 94, 98. In other arrangements, operation of the vehicle is controlled and eventually ended in response to the fault state. In conclusion, the arrangement provides a fault indication for the brake pedal force sensor arrangement when the first brake pedal force sensor 94 and the second brake pedal force sensor 98 do not provide a similar brake pedal force signal. Thus, the electronic processor 182 is configured to provide a fault indication for the brake pedal force sensor arrangement 140 when a brake pedal force signal from the first brake pedal force sensor 94 differs from a brake pedal force signal from the second brake pedal force sensor 98.

In another arrangement, the method includes a vehicle brake pedal position sensor 50, one or more brake pedal force sensors 94, 98 and providing an engine state signal or motor state signal from an engine state sensor or motor state sensor 54. In one feature, the electronic processor 82, 182 determines when the vehicle engine or vehicle motor is at rest from the engine state signal or the motor state signal from the engine state sensor or the motor state sensor 54. An engine state signal or a motor state signal can be visually displayed or provided on a vehicle dashboard. An audio engine state signal or motor state signal can also be provided by the electronic processor 82, 182.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including wired connections, wireless connections, etc.

It should also be noted that a plurality of hardware and software based devices, as well as a plurality of different structural components may be used to implement the embodiments. In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the embodiments may be implemented in software (e.g., stored on non-transitory computer-readable medium) executable by one or more processors. As such, it should be noted that a plurality of hardware and software based devices, as well as a plurality of different structural components may be utilized to implement the embodiments. For example, "electronic processors" and "controllers" as described in the specification can include standard processing components, such as one or more processors, one or more memory modules including non-transitory computer-readable medium, one or more input/output interfaces, and various connections (e.g., a system bus) connecting the components. The software may include instructions and algorithms for performing methods as described herein.

What is claimed is:

1. A method for determining a fault state in a vehicle brake system, the method including:
   receiving a brake pedal position signal from a brake pedal position sensor that indicates a driver intent to brake;
   receiving a brake pedal force signal from a brake pedal force sensor disposed within the brake pedal;
   receiving a vehicle braking response condition signal from a brake system feedback sensor for at least one vehicle wheel of a vehicle;
   determining, with an electronic processor, based on the brake pedal position signal and the vehicle braking response condition signal, that the vehicle brake system is in a fault state when (1) the brake pedal position signal is indicative of no brake pedal movement and the vehicle braking response condition signal is indicative of a vehicle braking response occurring, or when (2) the brake pedal position signal is indicative of brake pedal movement and the vehicle braking response condition signal is indicative of no occurrence of a vehicle braking response;
   providing an engine state signal or a motor state signal from an engine state sensor or a motor state sensor to the electronic processor; and
   providing at least one selected from a group consisting of: a visual or audio indicator indicating the fault state, and controlling operation of the vehicle in response to the fault state.

2. The method according to claim 1, wherein the vehicle braking response condition signal is sensed by the brake system feedback sensor in a hydraulic brake system disposed at the at least one of the vehicle wheels.

3. The method according to claim 1, wherein the brake system feedback sensor is one of a plurality of brake system feedback sensors disposed at each of the vehicle wheels.

4. The method according to claim 3, wherein the brake system feedback sensors include brake pressure sensors.

5. The method according to claim 1, wherein the vehicle is one from a group consisting of: an electric vehicle, an internal combustion engine vehicle, and a hybrid vehicle.

6. The method according to claim 1, including determining, with the electronic processor, when the vehicle engine or motor is at rest from the engine state signal or the motor state signal.

7. The method according to claim 1, including providing a brake pedal force sensor arrangement including the brake pedal force sensor and a second redundant brake pedal force sensor disposed within the brake pedal, wherein the method includes, with the electronic processor, providing a fault indication for the brake pedal force sensor arrangement when the brake pedal force sensor and the second brake pedal force sensor do not provide a similar brake pedal force signal.

8. The method according to claim 1, wherein the vehicle braking response condition signal that is sensed by the brake system feedback sensor is part of an electro-mechanical brake system disposed at the at least one of the vehicle wheels.

9. A vehicle brake system for determining a fault state in the vehicle brake system, the vehicle brake system comprising:
   a vehicle brake pedal position sensor for providing a brake pedal position signal from a brake pedal that indicates a driver intent to brake;
   a brake pedal force sensor disposed within the brake pedal for providing a brake pedal force signal;
   a brake system feedback sensor for providing a vehicle braking response condition signal;
   an engine state sensor or a motor state sensor that provides an engine state signal or a motor state signal to an electronic processor; and
   the electronic processor configured to:
      receive the brake pedal position signal and receive the vehicle braking response condition signal,
      determine a fault state when (1) the brake pedal position signal is indicative of no brake pedal movement and the vehicle braking response condition signal is indicative of a vehicle braking response occurring, or when (2) the brake pedal position signal is indicative of brake pedal movement and the vehicle braking response condition signal is indicative of no occurrence of a vehicle braking response; and
      provide at least one selected from a group consisting of: an audio or visual indication of a fault state, and a control of braking operation of the vehicle in response to the fault state.

10. The vehicle brake system according to claim 9, wherein the brake system feedback sensor is disposed at at least one of the vehicle wheels.

11. The vehicle brake system according to claim 9, wherein the brake system feedback sensor is one of a plurality of brake system feedback sensors disposed at each of the vehicle wheels.

12. The vehicle brake system according to claim 11, wherein the brake system feedback sensors include brake pressure sensors for a hydraulic brake system.

13. The vehicle brake system according to claim 11, wherein the brake system feedback sensors include brake pressure sensors for an electro-mechanical brake system.

14. The vehicle brake system according to claim 9, wherein the vehicle is one from a group consisting of: an electric vehicle, an internal combustion engine vehicle, and a hybrid vehicle.

15. The vehicle brake system according to claim 9, wherein the electronic processor is configured to determine when the vehicle engine or the vehicle motor is at rest from the engine state signal or the motor state signal.

16. The vehicle brake system according to claim 9, the vehicle brake system including:
   a brake pedal force sensor arrangement including the brake pedal force sensor and a second redundant brake pedal force sensor disposed within the brake pedal, and
   wherein the electronic processor is configured to provide a fault indication for the brake pedal force sensor arrangement when a brake pedal force signal from the brake pedal force sensor differs from a brake pedal force signal from the second brake pedal force sensor.

17. The vehicle brake system according to claim 11, wherein an average of the vehicle braking response conditions signals of the plurality of brake system feedback sensors is determined.

18. The method according to claim 3, wherein an average of the vehicle braking response conditions signals of the plurality of brake system feedback sensors is determined.

* * * * *